(No Model.)
J. M. FOSTER & B. F. KENT.
ROTARY KERF SPREADER.
No. 361,218. Patented Apr. 12, 1887.
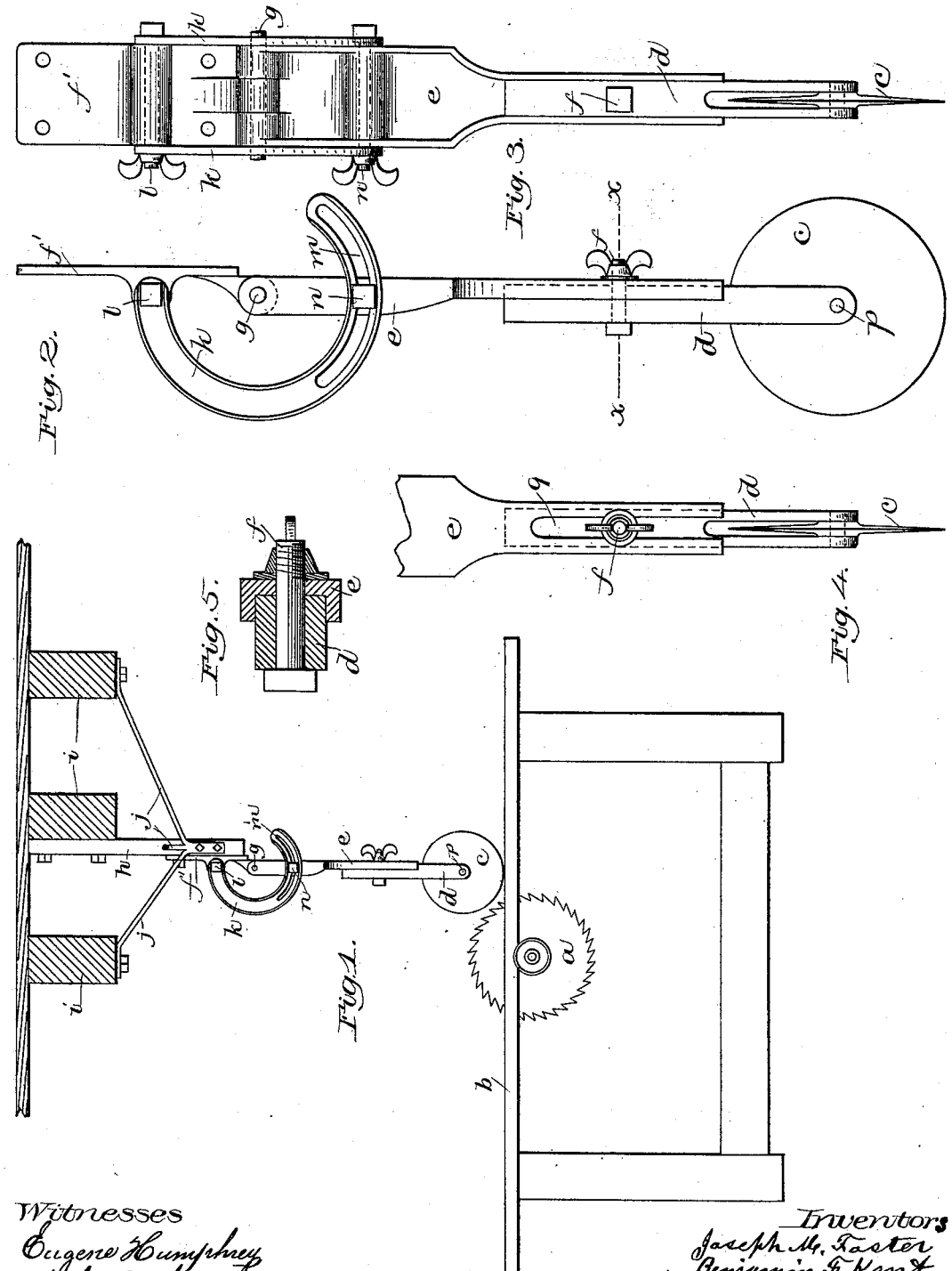
Witnesses
Eugene Humphrey
John L. Adams
Inventors
Joseph M. Foster
Benjamin F. Kent
per Porter & Hutchinson
Attys

UNITED STATES PATENT OFFICE.

JOSEPH M. FOSTER AND BENJAMIN F. KENT, OF SAUGUS, MASSACHUSETTS; SAID KENT ASSIGNOR, BY MESNE ASSIGNMENTS, TO BRADFORD W. THOMPSON, OF BOSTON, MASSACHUSETTS.

ROTARY KERF-SPREADER.

SPECIFICATION forming part of Letters Patent No. 361,218, dated April 12, 1887.

Application filed September 12, 1884. Renewed December 11, 1886. Serial No. 221,282. (No model.)

*To all whom it may concern:*

Be it known that we, JOSEPH M. FOSTER and BENJAMIN F. KENT, of Saugus, in the county of Essex and State of Massachusetts, have invented a new and useful Improvement in Rotary Saw-Guards, which will, in connection with the accompanying drawings, be hereinafter fully described, and specifically defined in the appended claims.

This invention has for its object the production of a circular guard to be arranged in rear of circular saws in close proximity thereto and to the saw-table, and which facilitates the action of the saw by widening the kerf cut in the lumber while being sawed, thereby rendering it easier to be sawed, and also protecting the teeth in their upward movement from being worn dull by friction against the lumber, and also effectually preventing the detached pieces of lumber from being caught by the saw-teeth and thereby thrown over the saw, and thus endangering those who are operating it; and it will, in connection with the accompanying drawings, be hereinafter more fully described and particularly claimed.

In said drawings, Figure 1 is a side elevation showing a circular saw mounted in a table in the usual manner and my invention as duly mounted and in position to co-operate therewith. Fig. 2 is an enlarged view taken as in Fig. 1, but omitting the saw, its table, and the overhead supports. Fig. 3 is an elevation taken as viewed from the left in Fig. 2. Fig. 4 is an elevation as from the right in Fig. 2, but omitting the upper portion of the devices. Fig. 5 is a horizontal section taken on line X X, Fig. 2.

In said views, $a$ represents a circular saw duly arranged relatively to its table $b$, both which are shown for purpose of illustration only. A disk, $c$, thicker at its center and reduced to a thin peripheral edge to enter the kerf cut by the saw, is arranged above the table in rear of and close to the saw, as shown in Fig. 1. This disk is pivotally mounted in forked bar $d$ upon pin $p$. Said bar $d$ is telescopically arranged in the trough-like slotted lower portion of bar $e$, and is locked at any desired height by bolt $f$, which passes through bar $d$ and a slot, $q$, in bar $e$, as shown in Fig. 4. Said bar $e$ is pivoted to plate $f'$ by pivot $g$, and said plate is bolted to a pendent bar, $h$, secured to a floor-timber, $i$, and is duly braced, as shown at $jj$. A pair of curved arc-like arms, $k\,k$, having longitudinal slots $m$ in their lower portion, are pivoted to plate $f'$ by bolt $l$, and a bolt, $n$, which passes through their said slots and bar $e$, serves as the means of locking the same firmly together.

By means of the vertical adjustment of bar $d$ and the swinging action of bar $e$, disk $c$ may be adjusted vertically in its relative distance above table $b$ and laterally relatively to the rear of saw $a$, such compound adjustment being necessary by reason of the employment of saws of different diameters upon the same arbor and table, as also by reason of the constant wearing away by use of the same saw, and, further, by reason of the varied thickness of the lumber that may be sawed, as in sawing thick lumber the lower edge of the disk should be farther from the table than when sawing that which is thinner.

As the thickness of disk $c$ where it enters the wood is greater than the width of the kerf, therefore it spreads the two parts into which the saw is subdividing the wood being sawed, and therefore liberates the rear portion of the saw from the side friction of the lumber; and, besides, as the disk is in the same vertical plane as is the saw, and as it is so close to table $b$ that none of the subdivided pieces of lumber can pass under it and be engaged by the teeth of the saw and be thereby thrown forward to the great danger and often injury of the workmen, it therefore serves as a guard against such casualties; and if such pieces of lumber, by the vibration of the table or other cause, are moved forward thereon at either side of the disk, so as to overlap the saw on either side, it cannot engage them with its teeth, as the disk holds such strip out of contact therewith.

It will be obvious that the means of supporting and adjusting my rotary guard may be varied in their details without departing from the more essential spirit thereof.

We claim as our invention—

1. The combination, with a circular saw and its supporting-table, of a disk formed with a diminished thickness at its periphery and pivotally connected with a supporting-bar, a secondary bar telescopically united with said disk-supporting bar and provided with means for interlocking said bars to secure the disk at the desired height above said table, and an upper portion adapted to be secured to an overhead support, whereby said disk is vertically adjusted at will and is supported above and independent of the table, substantially as specified.

2. The combination, with the kerf-spreading disk, a supporting-bar, and plate pivotally united, of arc-like arms connected with said plate and bar and provided with means whereby said bar may be liberated, adjusted, and locked in position for the horizontal adjustment of said disk relatively to the saw, substantially as specified.

3. The combination, with a rotary saw, its supporting-table, and a rotary kerf-spreading disk, of a telescopic supporting-bar, a locking-bolt to secure said bar when so adjusted, an upper portion or plate hinged to said bar, and an arm connected with said plate and bar and provided with devices to lock and secure said bar in the desired relative position to the saw when so adjusted, substantially as specified.

4. The combination, with the disk and its bar $d$, of bar $e$, telescopically connected therewith and provided with an extension adapted to be secured to the overhead support, substantially as specified.

5. The combination of disk $c$, pivoted in bar $d$, said bar and bar $e$ telescopically united, plate $f$, pivoted to bar $e$ and adapted to be secured to an overhead support, and arms $k$, connected with said plate and by an adjustable and locking connection with bar $e$, substantially as specified.

JOSEPH M. FOSTER.
BENJAMIN F. KENT.

Witnesses:
T. W. PORTER,
EUGENE HUMPHREY.